(12) United States Patent
Zaghib et al.

(10) Patent No.: US 11,417,878 B2
(45) Date of Patent: Aug. 16, 2022

(54) ELECTRODE MATERIALS IN THE FORM OF LITHIUM-BASED ALLOY AND METHODS FOR MANUFACTURING SAME

(71) Applicant: HYDRO-QUÉBEC, Montréal (CA)

(72) Inventors: Karim Zaghib, Longueuil (CA); Michel Armand, Paris (FR); Patrick Bouchard, Shawinigan (CA); Serge Verreault, St-Tite (CA); Nancy Turcotte, St-Tite (CA); Dominic Leblanc, Bécancour (CA); Kamyab Amouzegar, Mont-Royal (CA)

(73) Assignee: HYDRO-QUEBEC, Montreal (CA)

( * ) Notice: Subject to any disclaimer, the term of this patent is extended or adjusted under 35 U.S.C. 154(b) by 343 days.

(21) Appl. No.: 16/638,506

(22) PCT Filed: Aug. 15, 2018

(86) PCT No.: PCT/CA2018/050988
§ 371 (c)(1),
(2) Date: Feb. 12, 2020

(87) PCT Pub. No.: WO2019/033211
PCT Pub. Date: Feb. 21, 2019

(65) Prior Publication Data
US 2020/0365887 A1    Nov. 19, 2020

(30) Foreign Application Priority Data
Aug. 15, 2017  (CA) .................... CA 2976241

(51) Int. Cl.
*H01M 4/02* (2006.01)
*H01M 4/40* (2006.01)
(Continued)

(52) U.S. Cl.
CPC .............. *H01M 4/405* (2013.01); *C22C 1/02* (2013.01); *C22C 24/00* (2013.01); *H01M 10/052* (2013.01); *H01M 2004/027* (2013.01)

(58) Field of Classification Search
CPC ........................................................ H01M 4/02
See application file for complete search history.

(56) References Cited

U.S. PATENT DOCUMENTS

| 3,895,962 A | 7/1975 | Mead |
| 4,303,748 A | 12/1981 | Armand et al. |

(Continued)

FOREIGN PATENT DOCUMENTS

| CN | 101 886 197 B | 3/2012 |
| JP | H02 276157 A | 11/1990 |

(Continued)

OTHER PUBLICATIONS

Chumak et al. ("Li(Al1-zZnz) alloys as anode materials for rechargeable Li-ion batteries" J. Mater. Res., vol. 25, No. 8, Aug. 2010 pp. 1492-1499).*

(Continued)

*Primary Examiner* — Jacob B Marks
(74) *Attorney, Agent, or Firm* — Buchanan Ingersoll & Rooney P.C.

(57) ABSTRACT

The present technology described relates to lithium-based alloy electrode materials used for the production of anode in lithium accumulators and processes for obtaining same. The alloy comprises metallic lithium, a metallic component $X^1$ selected from magnesium and aluminum and a metallic component $X^2$ selected from alkali metals, alkaline earth metals, rare earths, zirconium, copper, silver, bismuth, cobalt, zinc, aluminum, silicon, tin, antimony, cadmium, mercury, lead, manganese, boron, indium, thallium, nickel, germanium, molybdenum and iron. Processes for preparing (Continued)

electrode materials thus obtained and their uses are also described.

25 Claims, 5 Drawing Sheets

(51) Int. Cl.
   *C22C 1/02*       (2006.01)
   *C22C 24/00*      (2006.01)
   *H01M 10/052*     (2010.01)

(56) References Cited

U.S. PATENT DOCUMENTS

| | | | |
|---|---|---|---|
| 4,434,213 | A | 2/1984 | Niles et al. |
| 4,578,326 | A | 3/1986 | Armand et al. |
| 4,758,483 | A | 7/1988 | Armand et al. |
| 5,102,475 | A | 4/1992 | Raynaud et al. |
| 5,283,136 | A | 2/1994 | Peled et al. |
| 5,350,647 | A | 9/1994 | Hope et al. |
| 5,528,920 | A | 6/1996 | Bouchard et al. |
| 5,705,293 | A | 1/1998 | Hobson |
| 5,798,191 | A | 8/1998 | Choquette et al. |
| 6,030,421 | A | 2/2000 | Gauthier et al. |
| 7,194,884 | B2 | 3/2007 | Laliberté et al. |
| 8,480,922 | B2 | 7/2013 | Richardson |
| 2011/0020708 | A1 | 1/2011 | Fujiki et al. |
| 2013/0202933 | A1 | 8/2013 | Nunome et al. |
| 2017/0179491 | A1 | 6/2017 | Zaghib et al. |

FOREIGN PATENT DOCUMENTS

| | | | |
|---|---|---|---|
| JP | 2006219323 A | 8/2006 |
| JP | 4253159 B2 | 4/2009 |
| WO | 2003107459 A1 | 12/2003 |
| WO | 2004068610 A2 | 8/2004 |
| WO | 2009111860 A1 | 9/2009 |

OTHER PUBLICATIONS

International Search Report (PCT/ISA/210) dated Nov. 1, 2018, by the Canadian Patent Office as the International Searching Authority for International Application No. PCT/CA2018/050988.
Written Opinion (PCT/ISA/237) dated Nov. 1, 2018, by the Canadian Patent Office as the International Searching Authority for International Application No. PCT/CA2018/050988.
Stark, Johanna K., et al., "Effect of Alkali and Alkaline Earth Metal Salts on Suppression of Lithium Dendrites", Journal of The Electrochemical Society, 161 (9), (2014), D418-D424.
Bale, et al., "Factsage Thermochemical Software and Databases—Recent Developments", CALPHAD: Computer Coupling of Phase Diagrams and Thermochemistry, vol. 33, 2009, pp. 295-311.
Brissot, et al., "Dendritic Growth Mechanisms in Lithium/Polymer Cells", Journal of Power Sources, vol. 81-82, 1999, pp. 925-929.
Brissot, "Study of the Mechanism of Dendritic Growth During Cycles in Lithium Solid Polymer Electrolyte Batteries", PhD Thesis, Ecole Polytechnique, Palaiseau, 1998, 187 pages.
Devaux, et al., "Failure Mode of Lithium Metal Batteries with a Block Copolymer Electrolyte Analyzed by X-Ray Microtomography", Journal of The Electrochemical Society, vol. 162, No. 7, 2015, pp. A1301-A1309.
Ding, et al., "Dendrite-Free Lithium Deposition via Self-Healing Electrostatic Shield Mechanism", Journal of the American Chemical Society, vol. 135, Feb. 28, 2013, pp. 4450-4456.
Gauthier, et al., "Large Lithium Polymer Battery Development the Immobile Solvent Concept", Journal of Power Sources, vol. 54, 1995, pp. 163-169.
Hovington, et al., "New Lithium Metal Polymer Solid State Battery for an Ultrahigh Energy: Nano C—LiFePO4 versus Nano Li1. 2V3O8", Nano Letters, vol. 15, Feb. 25, 2015, 32 pages.
Jana, et al., "Dendrite-Separator Interactions in Lithium-Based Batteries", Journal of Power Sources, vol. 275, 2015, pp. 912-921.
Li, et al., "A Review of Lithium Deposition in Lithium-Ion and Lithium Metal Secondary Batteries", Journal of Power Sources, vol. 254, 2014, pp. 168-182.
Linden, et al., "Handbook of Batteries, 3rd Edition", McGraw-Hill, 2002, 1454 pages.
Nitta, et al., "High-Capacity Anode Materials for Lithium-Ion Batteries: Choice of Elements and Structures for Active Particles", Particle and Particle Systems Characterization, vol. 31, 2013, pp. 1-20.
Richardson, et al., "Solid Solution Lithium Alloy Cermet Anodes", Journal of Power Sources, vol. 174, 2007, pp. 810-812.
Rosso, et al., "Dendrite Short-Circuit and Fuse Effect on Li/Polymer/ Li Cells", Electrochimica Acta, vol. 51, 2006, pp. 5334-5340.
Rosso, et al., "Onset of Dendritic Growth in Lithium/Polymer Cells", Journal of Power Sources, vols. 97-98, 2001, pp. 804-806.
Shi, et al., "Electrochemical Properties of Li—Mg Alloy Electrodes for Lithium Batteries", Journal of Power Sources, vol. 92, 2001, pp. 70-80.
Stark, et al., "Dendrite-Free Electrodeposition and Reoxidation of Lithium-Sodium Alloy for Metal-Anode Battery", Journal of The Electrochemical Society, vol. 158, No. 10, 2011, pp. A1100-A1105.
Stark, et al., "Nucleation of Electrodeposited Lithium Metal: Dendritic Growth and the Effect of Co-Deposited Sodium", Journal of The Electrochemical Society, vol. 160, No. 9, 2013, pp. D337-D342.
Steiger, et al., "Mechanisms of Dendritic Growth Investigated by in situ Light Microscopy During Electrodeposition and Dissolution of Lithium", Journal of Power Sources, vol. 261, 2014, 33 pages.
Vega, et al., "Electrochemical Comparison and Deposition of Lithium and Potassium from Phosphonium- and Ammonium-TFSI Ionic Liquids", Journal of The Electrochemical Society, vol. 156, No. 4, 2009, pp. A253-A259.
Watarai, et al., "A Rechargeable Lithium Metal Battery Operating at Intermediate Temperatures Using Molten Alkali Bis(Trifluoromethylsulfonyl)Amide Mixture as an Electrolyte", Journal of Power Sources, vol. 183, 2008, pp. 724-729.
Xu, et al., "Lithium Metal Anodes for Rechargeable Batteries", Energy & Environmental Science, vol. 7, 2014, pp. 513-537.
Yang, et al., "Effects of Pulse Plating on Lithium Electrodeposition, Morphology and Cycling Efficiency", Journal of Power Sources, vol. 272, 2014, pp. 900-908.
Office Action dated Sep. 9, 2021, by the Intellectual Property India, Government of India in corresponding Indian Patent Application No. 202017006230, and an English Translation of the Office Action. (6 pages).
Extended European Search Report dated Apr. 19, 2021, issued by the European Patent Office in corresponding European Application No. 18846110.7-1108, 12 pages.
Peled, E. et. al. "Lithium Alloy-Thionyl Chloride Cells: Performance and Safety Aspects" J Electrochem. Soc., Jun. 1983, vol. 130, No. 6, pp. 1365-1368. XP-002478467.
Notice of Reasons for Rejection, Japanese Patent Office, in corresponding Japanese Application No. 2020-508363, dated May 6, 2022, 15 pages (with English translation).

* cited by examiner

ELECTRODE MATERIALS IN THE FORM OF LITHIUM-BASED ALLOY AND METHODS FOR MANUFACTURING SAME

RELATED APPLICATION

This application claims priority, under applicable law, to Canadian patent application No. 2,976,241 filed on Aug. 15, 2017, the content of which is incorporated herein by reference in its entirety for all purposes.

TECHNICAL FIELD

The present application refers to the field of electrochemical cells. The technology more specifically relates to a method for producing electrode materials in the form of lithium-based alloy, to the alloys and electrode materials thus obtained, and to their uses, for example, as anode in lithium batteries.

BACKGROUND

Since the initial pioneering work of Armand (U.S. Pat. No. 4,303,748) suggesting the use of polymer electrolytes in lithium metal batteries, significant efforts have been devoted in the 1980s to develop polyether-based solid polymer electrolyte lithium accumulators. The development of lithium salts such as Li$^+$FSI$^-$ and Li$^+$TFSI$^-$ together with amorphous polymer hosts has made it possible to obtain better conductivity with a solid electrolyte (Gauthier, M. et al. *J. of Power Sources* 54.1 (1995): 163-169). In the early 1990s, however, lithium-ion batteries were developed in order to improve the safety of the electrical device. However, in terms energy density the all-solid-state lithium accumulator is still very attractive (Hovington, P. et al. *Nano letters* 15.4 (2015): 2671-2678).

Lithium metal is described as the ideal anode material for rechargeable batteries due to its very high theoretical specific capacity (3860 mAh·g$^{-1}$), low density (0.53 g·cm$^{-3}$) and because lithium has the lowest electrochemical potential (−3.04 V vs. SHE) (Xu, W., et al. *Energy &Environ. Sci.* 7.2 (2014): 513-537). All-solid-state lithium accumulators have numerous advantages over conventional liquid electrolyte batteries. These advantages generally include a lower weight as well as significantly higher power density and specific energy. In addition, these batteries are considered to be more environmentally friendly since they would eliminate the risk of toxic liquid electrolyte leaking into the environment.

However, lithium is a metal which, in addition to having very high reactivity with moisture in the air, has poor mechanical properties and has a marked tendency to adhere to the majority of materials. (U.S. Pat. No. 5,528,920 and U.S. 2017/0179491 A1). These are all factors that make it difficult to obtain thin lithium foils by rolling, particularly if thicknesses of less than 200 μm are to be obtained. Moreover, several critical problems are associated with the use of the conventional lithium metal anode; for example, security issues and particularly problems related to the formation of a dendritic structure during repeated cycles leading to reduced coulombic efficiency thereby affecting the system's rechargeability and performance. Another problem inherent to the use of a lithium metal negative electrode is its low melting point (180.6° C.) which limits the use of the electrochemical cell at temperatures below this melting point (U.S. Pat. No. 5,705,293).

The anode is generally made of light metallic foil based on alkali metals such as lithium metal, aluminum-lithium alloys or the like. Solid lithium, pure or containing a low weight percentage of additional alloying metals, is so ductile that it can be easily cut and worked at room temperature. The production of the thin lithium metal film is usually made by extrusion (see FIG. 1 of U.S. Pat. No. 7,194,884). Lithium metal flows through the die, progressively reducing the metallic flow to its final desired shape. In the case of a lithium anode, a thin lithium metal foil having a thickness of 150 to 300 microns can be directly obtained by extrusion. The thin foil is further laminated (rolled) to obtain an ultra-thin lithium film (15 to 50 μm) (see FIG. 1 of U.S. Pat. No. 5,528,920).

The addition of aluminum or magnesium improves the lithium's rheology during the shaping process (U.S. Pat. No. 7,194,884). Aluminum or magnesium-containing alloys (U.S. Pat. No. 5,102,475) also adhere less to the surface of the laminating rollers. These lithium alloys improve the lithium's rheology during the shaping of ultra-thin foils. The Li—Mg alloy can also increase the melting point allowing the anode to withstand higher temperatures, and therefore, the use of the battery over an extended temperature range (U.S. Pat. No. 5,705,293). However, these do not significantly improve the battery life cycle. This property is mainly controlled by the stability of the interface of the lithium with the solid electrolyte.

The main factor limiting the use of a lithium metal anode is the formation of dendrites on the electrode surface (Xu, W. et al. *Energy Environ. Sci.* 7.2 (2014): 513-537; Steiger, P. et al. *J. Power Sources* 261 (2014): 112-119; and Jana, A. et al. *J. Power Sources* 275 (2015): 912-921). Generally, the presence of dendrites progressively increases during charge and discharge cycles, frequently resulting in an electrical short circuit between the electrodes or to a disconnection and electrical isolation of lithium. The formation of dendrites can be minimized by the use of a slow-charging rate, a solid electrolyte and application of a constant compressive force on the battery (Li, Z. et al. *J. power sources* 254 (2014): 168-182; Yang, H. et al. *J. Power Sources* 272 (2014): 900-908; and Devaux, D. et al. *J. Electrochem. Soc.* 162.7 (2015): A1301-A1309). Some additives added to the electrolyte, for example, alkali metal ions (K$^+$, Na$^+$, Rb$^+$, Cs$^+$) were described as possibly having a stabilizing effect on electrodeposition and reducing dendritic lithium growth (Watarai, A. et al. *J. Power Sources* 183 (2008) 724-729; Vega, J. A. et al. *J. Electrochem. Soc.* 156 (2009) A253-A259; Stark, J. K. et al. J. Electrochem. Soc. 158 (2011): A1100-A1105; Ding, F. et al. *J. Am. Chem. Soc.* 135 (2013) 4450-4456; Stark, J. K. et al. *J. Electrochem. Soc.* 160 (2013) D337-D342; and Goodman, J. K. S. et al. *J. Electrochem. Soc.* 161 (2014) D418-D424). However, the addition of these ions to the electrolyte requires the prior preparation of salts comprising them (such as MTFSI) leading to a substantial increase in production costs.

Consequently, there is an increased need for electrode materials in alloy form that would provide at least one of the following advantages in comparison with conventional lithium metal anodes, namely improved conservation, rheology, electrochemical properties, grain size, lithium diffusion, obtaining a more stable passivation layer, reducing dendritic growth, an increase in melting point of the anode, or improvement of inherent safety of lithium accumulators. There is also a need for a method for producing electrode materials providing at least one of the following advantages: direct single-step lamination (rolling) process, better surface finish or reduced manufacturing costs.

SUMMARY

According to one aspect, the present technology relates to an electrode material comprising, in the form of an alloy:

metallic lithium;
a metallic component $X^1$ selected from magnesium and aluminum; and
a metallic component $X^2$ selected from alkali metals, alkaline earth metals, rare earth metals, zirconium, copper, silver, manganese, zinc, aluminum, silicon, tin, molybdenum and iron;

wherein the metallic component $X^2$ is different from the metallic component $X^1$ and different from metallic lithium; and wherein the metallic lithium is present at a concentration of at least 65% by weight, the metallic component $X^1$ is present at a concentration between 0.1 and 30% by weight, the component $X^2$ is present at a concentration between 0.1 and 5% by weight, and where the concentration of components $[X^1+X^2]$ in the material is between 0.2% and 35%, where $[Li]>[X^1]>[X^2]$.

According to another aspect, the present technology relates to an electrode material comprising, in the form of an alloy:
metallic lithium;
a metallic component $X^1$ selected from magnesium and aluminum; and
a metallic component $X^2$ selected from alkali metals, alkaline earth metals, rare earths, Zr, Cu, Ag, Bi, Co, Zn, Al, Si, Sn, Sb, Cd, Hg, Pb, Mn, B, In, TI, Ni, Ge;

wherein the metallic component $X^2$ is different from the metallic component $X^1$ and different from metallic lithium; and wherein the metallic lithium is present at a concentration of at least 65% by weight, the metallic component $X^1$ is present at a concentration between 0.1 and 30% by weight, the component $X^2$ is present at a concentration between 0.05 and 5% by weight, and wherein the concentration of the components $[X^1+X^2]$ in the material is between 0.15% and 35%.

According to one embodiment, the metallic component $X^1$ is magnesium. According to another embodiment, the metallic component $X^1$ is aluminum.

In one embodiment, the metallic component $X^2$ is selected from Na, K, Zr and rare earths. In another embodiment, the metallic component $X^2$ is an alkali metal selected from Na, K, Rb and Cs. In an embodiment, the metallic component $X^2$ is an alkaline earth metal selected from Mg, Ca, Sr and Ba. In another embodiment, the metallic component $X^2$ is a metal from the rare earth family selected from Sc, Y, La, Ce, Pr, Nd, Sm, Eu, Gd, Tb, Dy, Ho, Er, Tm, Yb, Lu and their mixtures (such as a mischmetal). In another embodiment, the metallic component $X^2$ is selected from Zr, Cu, Ag, Bi, Co, Zn, Al, Si, Sn, Sb, Cd, Hg, Pb, Mn, B, In, Ti, Ni or Ge.

According to an example, the electrode material is an ultra-thin foil having a thickness of 15 to 300 µm. For example, the thickness is of 15 to 200 µm, or of 15 to 100 µm, or the thickness is of 15 to 50 µm.

According to another aspect, the present technology relates to a process for preparing an electrode material as defined herein, the process comprising the following steps:
a. alloying by melting the metallic lithium with the metallic component $X^1$ in a molten alloy bath;
b. adding the metal component $X^2$ to the molten alloy bath; and
c. solidifying the alloy obtained in (b) in a permanent mold having a form suitable for extrusion such as a billet form.

In one embodiment, the process further comprises the following steps:
d. transforming the solid billet into a thin foil (100-300 µm) suitable for rolling; and
e. transforming the thin foil into an ultra-thin foil (15-50 µm) by rolling.

In another embodiment, the alloy solidification step is carried out in a permanent mold at a controlled rate.

According to another aspect, the present technology relates to an anode comprising an electrode material as defined herein applied on a current collector. For example, the present technology relates to an anode comprising the ultra-thin foil as obtained in step (e) of the process as defined above applied on a current collector.

According to yet another aspect, the present technology relates to an electrochemical cell comprising a cathode, an electrolyte and an anode, wherein the anode comprises an electrode material as defined herein. For instance, the electrochemical cell comprises a cathode, an electrolyte and an anode as defined in the preceding paragraph. According to another example, the electrochemical cell comprises a cathode, an electrolyte and an anode comprising the electrode material obtained by the process as defined herein.

According to a last aspect, the present technology relates to a lithium accumulator comprising an electrochemical cell as defined herein.

DETAILED DESCRIPTION

Figure 1:
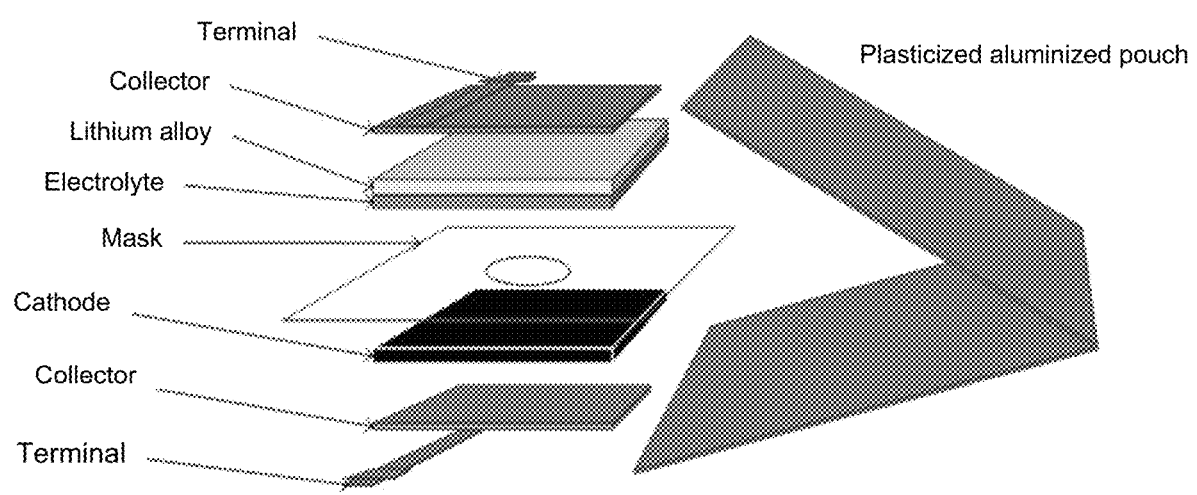
FIG. 1 is an exploded view illustrating the various layers of a pouch-type cell according to one embodiment.

All technical and scientific terms and expressions used herein have the same definitions as those commonly understood by the person skilled in the art related to the present technology. The definition of some terms and expressions used is nevertheless provided below.

The term "about" as used in the present document means approximately, in the region of, or around. When the term "about" is used in relation to a numerical value, it modifies it by a variation of 10% above and below its nominal value. This term may also take into account, for instance, the experimental error of a measuring apparatus or rounding.

When a range of values is mentioned in the present application, the lower and upper limits of the range are, unless otherwise indicated, always included in the definition.

The expression "compatible with lithium" as used in the present document means the absence of a chemical reaction with lithium, or a limited chemical reaction leading to the formation of a passivation film that is not detrimental to electrochemical exchanges at the lithium/electrolyte interface of an electrochemical cell. When the term "compatible with lithium" is used in reference to a cathode material, it refers to a cathode material which is electrochemically compatible and of opposite polarity to that of the anode.

The present application describes electrode materials comprising metallic lithium and at least two additional metallic components $X^1$ and $X^2$. The metallic component $X^1$ is magnesium or aluminum (Mg or Al). The metallic component $X^2$ is selected from alkali metals ($X^2$=Na, K, Rb or Cs), alkaline earth metals ($X^2$=Mg, Ca, Sr or Ba), rare earths ($X^2$=Sc, Y, La, Ce, Pr, Nd, Sm, Eu, Gd, Tb, Dy, Ho, Er, Tm, Yb, Lu or their mixtures, for example, a mischmetal), and transition metals ($X^2$=Zr, Cu, Ag, Bi, Co, Zn, Al, Si, Sn, Sb, Cd, Hg, Pb, Mn, B, In, TI, Ni, Ge, Mo or Fe); the metallic component $X^2$ being different from metallic lithium and from the metallic component $X^1$. For example, the component $X^1$ is magnesium and the component $X^2$ is selected from Na, K, Zr, Al, and rare earths. In another example, the component $X^1$ is aluminum and the component $X^2$ is selected from Na, K, Mg, Zr, and rare earths. According to another example, the component $X^2$ is selected from Zr, Cu, Ag, Bi, Co, Zn, Al, Si, Sn, Sb, Cd, Hg, Pb, Mn, B, In, TI, Ni and Ge.

In one embodiment, the material is composed of a ternary alloy, meaning that it excludes the presence of any additional element in significant concentration. According to one example, the ternary alloy does not comprise an additional element at a concentration greater than or equal to 0.1%, preferably the ternary alloy does not comprise an additional element at a concentration greater than or equal to 0.05%.

The present application also proposes a process for producing electrode materials as defined herein and comprising, in the form of an alloy, metallic lithium, a metallic component $X^1$ ($X^1$=Mg or Al) and a metallic component $X^2$ which is different from metallic lithium and from the metallic component $X^1$ and is selected from alkali metals ($X^2$=Na, K, Rb or Cs), alkaline earth metals ($X^2$=Mg, Ca, Sr or Ba), rare earths ($X^2$=Sc, Y, La, Ce, Pr, Nd, Sm, Eu, Gd, Tb, Dy, Ho, Er, Tm, Yb, Lu or a mischmetal), and transition metals ($X^2$=Zr, Cu, Ag, Zn, Al, Si, Sn, Sb, Cd, Hg, Pb, Mn, B, In, TI, Ni, Ge, Mo or Fe) for use as anode in electrochemical cells.

According to a first embodiment, the present application describes a process for producing electrode materials in the form of lithium-based alloy, comprising the following steps:
a. combining by melting the metallic lithium with the metallic component $X^1$ in a molten bath to form an alloy;
b. adding the metallic component $X^2$ to the molten alloy bath;
c. controlled solidification of the alloy (to avoid segregation of the alloying elements) in the form of a billet in a permanent mold;
d. optionally, extruding the billet at room temperature to obtain a thin foil (100-600 µm, or 100-500 µm, or 100-400 µm, or even 100-300 µm);
e. optionally, rolling the thin foil at room temperature to obtain an ultra-thin foil having a thickness between 15 and 200 microns, or 15 and 150 microns, or 15 and 100 microns, or even between 15 and 50 microns, for example, in a single step; and
f. optionally, using the ultra-thin foil as anode in a lithium accumulator.

I. Combination Process by Melt:

According to one embodiment, the alloy comprising metallic lithium, magnesium or aluminum and comprising the metallic component $X^2$ is prepared by melting at a temperature greater than 180° C. and cast using conventional metallurgical techniques and respecting the usual precautions with regards to the manufacture of lithium. The composition is made from commercially pure materials. This melting may be performed in one or more steps. For example, the lithium may be first melted before adding the other metallic components, which may be added together or separately. For example, metallic lithium is first melted, then the component $X^1$ is added to form a first binary alloy, the component $X^2$ is then added to form a ternary molten alloy.

II. Solidification Process:

Alloy solidification is carried out by decreasing the temperature in a controlled manner. Solidification is accomplished in a permanent mold to prevent the segregation phenomenon during solidification. Thus, the temperature of the liquid metallic mixture is decreased near the liquidus temperature and then rapidly decreased below the solidus temperature by adjusting the flow rate to maintain a minimum of liquid alloy in the permanent mold (for phase diagram calculations, see Bale, C. W. et al. *Calphad* 33.2 (2009): 295-311). The shape of the permanent mold is selected to obtain a billet shape suitable for extrusion. According to one example, the shape of the mold makes it possible to obtain cylindrical electrode material billets of 6 inches in diameter.

III. Electrode Material Composition:

According to an aspect, the alloy comprises metallic lithium, a metallic component $X^1$ ($X^1$=Mg or Al) and a metallic component $X^2$. For example, the metallic component $X^2$ is selected from alkali metals (such as Na, K, Rb or Cs), alkaline earth metals (such as Mg, Ca, Sr or Ba), rare earths (such as Sc, Y, La, Ce, Pr, Nd, Sm, Eu, Gd, Tb, Dy, Ho, Er, Tm, Yb, Lu or a mixture thereof, for example, the mischmetal) and transition metals (such as Zr, Cu, Ag, Zn, Al, Si, Sn, Sb, Cd, Hg, Pb, Mn, B, In, TI, Ni, Ge, Mo or Fe). The metallic component $X^2$ is different from the metallic lithium and the metallic component $X^1$, i.e. if $X^1$ is aluminum, then $X^2$ is different from aluminum, and if $X^1$ is magnesium, then $X^2$ is different from magnesium. For example, the component $X^1$ is magnesium and the component $X^2$ is selected from Na, K, Zr, Al and rare earths. In another example, the component $X^1$ is aluminum and the component $X^2$ is selected from Na, K, Mg, Zr and rare earths. The metallic lithium, the metallic component $X^1$ and the metallic component $X^2$ are all commercially pure ($\geq$99.9%).

The alloy comprises the metallic lithium at a concentration greater than the concentration of the metallic component $X^1$ ([Li]>[X]) and of $X^2$ ([Li]>[$X^2$]). According to one example, the alloy comprises metallic lithium at a concentration greater than that of the metallic component $X^1$ which is, itself, greater than the concentration of the metallic component $X^2$ ([Li]>[$X^1$]>[$X^2$]). Lithium is present in the alloy at a concentration of between 65 and 99.8% by weight, for example, between 65 and 98% by weight, or for example between 70 and 98% by weight, or between 65 and 80% by weight, between 65 and 90% by weight, or between 75 and 98% by weight, or between 75 and 95% by weight, or between 80 and 98% by weight, etc. The metallic component $X^1$ has a concentration of between 0.1 and 30% by weight, for example, between 1 and 30% by weight, or for example between 1 and 25% by weight, or between 1 and 15% by weight, or between 5 and 20% by weight, or between 5 and 15% by weight, or between 10 and 30% by weight, or between 10 and 20% by weight. The metallic component $X^2$ (for example, $X^2$=Na, K, Rb, Cs, Mg, Ca, Sr, Ba, Sc, Y, La, Ce, Pr, Nd, Sm, Eu, Gd, Tb, Dy, Ho, Er, Tm, Yb, Lu, a mischmetal, Zr, Cu, Ag, Zn, Al, Si, Sn, Sb, Cd, Hg, Pb, Mn, B, In, TI, Ni, Ge, Mo or Fe) is present at a concentration of between 0.05 to 5% by weight, for example, between 0.1 to 5% by weight, between 0.5 and 5% by weight, or for example between 1 and 5% by weight, or between 2 and 5% by weight, or between 0.05 and 3% by weight, or between 0.1 and 3% by weight, or between 0.5 and 3% by weight. The concentration of additives [$X^1$+$X^2$] in the alloy material is less than the concentration of lithium, for example, being between 0.15% and 35% by weight, for instance, between 0.2% and 35% by weight, or between 2% and 35% by weight, or between 2 and 30% by weight, between 10 and 35% by weight, between 20 and 35% by weight, between 2 and 25% by weight, between 5 and 25% by weight, or between 2 and 20% by weight. According to one example, the total composition of the alloy is such that [Li]+[$X^1$]+[$X^2$]=100%. This total of 100% may also take into account the relative purity of the three elements (each being substantially pure, i.e. commercially pure).

The concentration of metallic components $X^1$ and $X^2$ is selected in order to optimize either the rheological behavior of the lithium alloy during the lamination (rolling) or the electrochemical cycling results (stability of the passivation layer and dendritic growth).

The metallic component $X^2$ may be selected from alkali metals including sodium, potassium, rubidium or cesium and excluding metallic lithium.

The metallic component $X^2$ may also be selected from alkaline earth metals including magnesium, calcium, strontium or barium, the metallic component $X^2$ being different from the metallic component $X^1$.

The metallic component $X^2$ may be selected from rare earths including scandium, yttrium, lanthanum, cerium, praseodymium, neodymium, samarium, europium, gadolinium, terbium, dysprosium, holmium, erbium, thulium, ytterbium or lutetium, and mischmetal.

Finally, the metallic component $X^2$ may be selected from Zr, Cu, Ag, Bi, Co, Zn, Al, Si, Sn, Sb, Cd, Hg, Pb, Mn, B, In, Tl, Ni, Ge, Mo or Fe. The metallic component $X^2$ is different from the metallic component $X^1$.

IV. Extrusion Process:

According to one embodiment, a billet made of an electrode material is extruded in a conventional manner, for example, using a hydraulic press to obtain a thin foil having a thickness of about 100 to 300 microns. The pressure applied to the alloy ingot obviously depends on the plasticity of the alloy, but usually varies between 100 and 500 tons for a billet of 6-inches in diameter (U.S. Pat. No. 7,194,884). The substantial deformation of the billet during extrusion improves the chemical homogeneity of the alloy.

V. Lamination (Rolling) Process:

The thickness of the foil is reduced by lamination (rolling) at room temperature and under dry air to obtain an ultra-thin foil. Lamination is carried out using a conventional method, for example, between two working rolls under sufficient pressure, speed and angle to reduce the thickness of the film to obtain an ultra-thin foil, for example, having a thickness between about 15 μm and 50 μm. The lamination, according to this embodiment, may be carried out in a single continuous step, and at a rolling speed of up to 50 m/min, preferably up to 20 m/min (U.S. Pat. No. 5,528,920). The strong reduction in thickness of the foil heats the alloy and allows for homogenization by strain hardening and recrystallization of its structure. The lamination step also significantly influences the surface finish of the foil as well as the grain size of its crystalline structure.

VI. Symmetric and Electrochemical Cells:

The ultra-thin foils of alloys made of electrode materials as produced herein are useful for the manufacture of electrochemical cells. For example, the electrochemical cells comprise at least one cathode, one anode including an electrode material of the present technology (for example, in the form of an ultra-thin foil) and an electrolyte located between the cathode and the anode.

a. Cathodes

The present application describes the use of symmetric cells to assess the performance of the various lithium alloys to dendritic growth; i.e. a lithium alloy anode (and cathode). Alternatively, the present application describes the use of the ultra-thin lithium-based alloy foils (anode) in combination with lithium iron phosphate (LFP) as electrochemically active cathode material.

However, the described anode could be used in an electrochemical battery having any active material compatible with lithium. Non-limitative examples of electrochemically active cathode materials include metal phosphates and lithium metal phosphates (for example, LiM'$PO_4$ and M'$PO_4$, where M' is Fe, Ni, Mn, Co or a combination thereof), vanadium oxides (for example, Li$V_3O_8$, $V_2O_5$F, Li$V_2O_5$ and the like), and other lithium metal oxides such as Li$Mn_2O_4$, LiM"$O_2$ (M" being Mn, Co, Ni or a combination thereof), Li(NiM''')$O_2$ (M''' being Mn, Co, Al, Fe, Cr, Ti, Zr, and the like or a combination thereof), or a combination of two or more of the above materials when compatible with each other and with the lithium anode. For example, the cathode active material is lithium iron phosphate (LFP). The cathode active material may also be in the form of particles optionally coated with carbon, for instance, obtained by pyrolysis of an organic precursor.

The cathode electrochemically active material may also further comprise an electron conducting material, for example, a carbon source such as carbon black, Ketjen™ black, acetylene black, graphite, graphene, carbon fibers, carbon nanofibers (e.g. VGCF) or carbon nanotubes. For example, the active material comprises acetylene black and VGCF.

The electrochemically active material may further comprise a binder. For example, the binder is a polymer used in polymer electrolytes.

b. Electrolyte

The present application describes a lithium film that may be used with a solid polymer electrolyte in an electrochemical cell or a lithium battery, for example, in an all-solid-state lithium accumulator. However, it may be used with any liquid, gel polymer or solid polymer electrolyte provided that it is compatible with the use of pure lithium electrodes or with the lithium alloys of the present application.

Non-limiting examples of solid polymer electrolyte may comprise one or more optionally crosslinked polar solid polymers and at least one salt, for example, a lithium salt such LiTFSI, Li$PF_6$, LiDCTA, LiBETI, LiFSI, Li$BF_4$, LiBOB, etc. Polyether type polymers such as those based on poly(ethylene oxide) (PEO) may be used, but several other lithium compatible polymers are also known for producing solid polymer electrolytes.

Compatible liquid electrolytes include, without limitation, organic liquid electrolytes comprising a polar aprotic solvent such as ethylene carbonate (EC), diethyl carbonate (DEC), propylene carbonate (PC), dimethyl carbonate (DMC), ethylmethyl carbonate (EMC), γ-butyrolactone (γ-BL), vinyl carbonate (VC) and mixtures thereof, and lithium salts. Other examples of compatible liquid electrolytes include molten salt electrolytes comprising lithium salts such as LiCl, LiBr, LiF and compositions comprising them, or organic salts.

Compatible gel-type polymer electrolytes may include, for example, polymer precursors and lithium salts, an aprotic polar solvent, and a polymerization/cross-linking initiator when needed. Examples of such gel electrolytes include, without limitation, gel electrolytes described in WO2009/111860 A1 and WO2004/068610 A2. The gel electrolyte, like the liquid electrolyte, can impregnate a separator such as a polymer separator.

For example, the electrolyte may be a branched polymer electrolyte comprising an ethylene oxide copolymer in which a lithium salt LiTFSI is dissolved.

c. Anode

According to another aspect, the anode comprises the material as defined herein, preferably in the form of a thin or ultra-thin foil, applied on a current collector. An example of a current collector includes copper or nickel. However, other types of current collectors compatible with metallic lithium or the alloy of the present application could also be used.

According to one example, the electrochemical cells of the present application are pouch-type cells and comprise the following elements: a plasticized and aluminized pouch, two terminal tabs for connection, two current collectors, a cathode, a mask having a defined size, an electrolyte and a lithium alloy anode. A schematic of a pouch-type cell assembly is shown in FIG. 1. Alternatively, the cells of the present application are pouch-type symmetric cells as described in FIG. 2 and comprise the following elements: a plasticized and aluminized pouch, two terminal tabs for connection, two current collectors, a mask having a defined size, an electrolyte and two lithium alloy electrodes.

Figure 2:
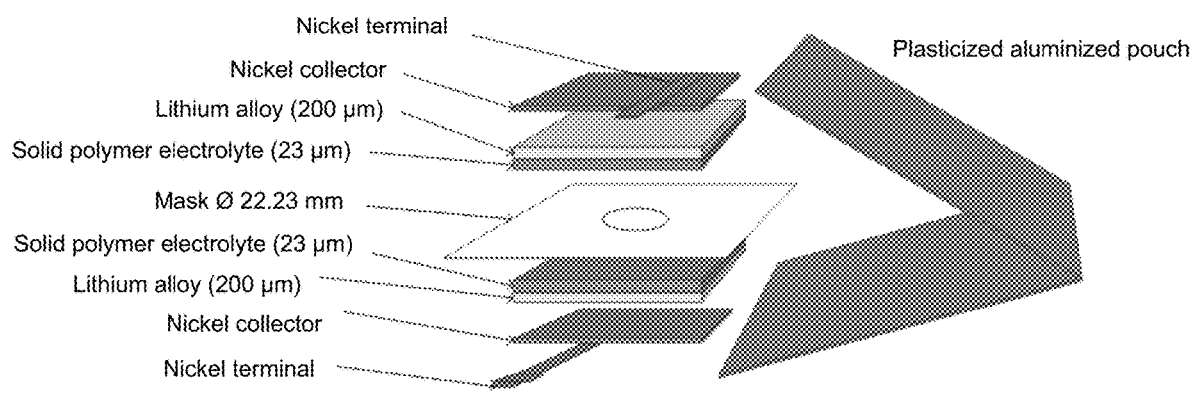
FIG. 2 is an exploded view illustrating the various layers of a pouch-type symmetric cell according to one embodiment.

As described in Brissot's PhD thesis (Brissot, C. École Polytechnique, Palaiseau, 1998), dendritic growth has been studied in a symmetrical cell as shown in FIG. 2 comprising two lithium electrodes and a polymer electrolyte (PEO and LiTFSI) in order to overcome cathode related problems.

These cells reproduce the geometry of industrial batteries on a small surface area of the order of a few square centimeters. The element in film form are stacked flat and intercalated with a 22.2 mm polypropylene mask which clearly delimits the active surface of electrodes exposed to the electrolyte (3.8 cm$^2$), and prevents possible internal short circuiting between electrodes.

The electrode material as described herein could also be used in lithium accumulators such as lithium batteries, lithium-air batteries or lithium-sulfur batteries.

According to another aspect, the electrochemical cells of the present application are used in hybrid or electric vehicles, or in portable electronic devices.

EXAMPLES

The following non-limiting examples are illustrative and should not be construed as further limiting the scope of the present invention as described.

Example 1: Preparation of Binary Alloy Electrode Materials (a) Binary Li—Al0.2 Alloy 1.8 kg of a Li—Al0.2 base alloy is first prepared to carry out all ternary ternary alloy fusion batches as well as a binary alloy reference. This lithium-based alloy was prepared by combining metallic lithium (99.8% by weight) with the component X$^1$ in cases where there is aluminum (0.2% by weight).

The alloy is prepared in a melting system consisting of a tilting resistance furnace having a power of 5.5 kW and equipped with a lid having a central opening, a 316L stainless steel crucible and a 316L removable mechanical stirrer. The melting system is installed in a glove box under an argon inert atmosphere to avoid any reaction that may contaminate the lithium alloy. The solidification of the binary liquid mixture is carried out in a permanent cylindrical-type mold made of 316 L stainless steel and having a 6 inches inner diameter.

1.8 kg of pure lithium (99.95% Li, FMC Lithium™) was first introduced in the crucible and the furnace lid was lowered. The solid lithium load is then melted by gradually increasing the power of the furnace and the temperature of the liquid lithium is increased up to 300° C. The mechanical stirrer is then lowered through the lid opening and a slow stirring of the liquid mass is started. A 3.6 g quantity of granular aluminum (99.9% Al, Aldrich) is added to the liquid bath through the lid opening while maintaining the mechanical agitation. Stirring is maintained for a period of 30 minutes to dissolve the aluminum granules and to allow the homogenization of the liquid mixture. The mechanical stirrer is then removed to allow the resistance furnace to tilt. The resistance furnace is gradually tilted to pour the molten metal into the mold at a constant rate for a period of 5 minutes. The upper opening of the permanent mold is then covered using a thermal insulator and the alloy was allowed to completely solidify and to cool to room temperature.

Once cooled down, the 1.8 kg billet is removed from the mold and both ends are cut with a band saw. The billet is then extruded using a 500-ton hydraulic press, in an anhydrous chamber at room temperature, to form a thin foil having a thickness of about 300 μm (U.S. Pat. No. 7,194,884) and in order to obtain a homogeneous binary alloy that can serve as a base to produce ternary alloys.

A chemical analysis by ICP-OES spectrometry was carried out on the binary Li-Al0.2 alloy thin foil and an aluminum content of 0.206% by weight was obtained.

(b) Binary Li—Mg10 Alloy

A quantity of 1.8 kg of a binary Li—Mg10 base alloy is prepared using the melting system as described in Example 1(a). This lithium-based alloy was prepared by combining metallic lithium (90% by weight) with the metallic component X$^1$, in this case magnesium (10% by weight).

1.62 kg of pure lithium (99.95% Li, FMC Lithium™) is first introduced in the crucible and the furnace lid is lowered. The solid lithium load is then melted by gradually increasing the power of the furnace and the temperature of the liquid lithium is increased up to 300° C. The mechanical stirrer is then lowered through the lid opening and a slow stirring of the liquid mass is started. A 180 g quantity of granular magnesium (99.9% Mg, Aldrich) is added to the liquid bath through the lid opening over a period of 30 minutes. Once the magnesium addition is completed, the alloy temperature is increased to 300° C. and stirring is maintained for a period of 30 minutes to completely dissolve the magnesium granules and to allow the homogenization of the liquid mixture. The mechanical stirrer is then removed to allow the resistance furnace to tilt. The resistance furnace is gradually tilted in order to pour the molten metal into the mold at a constant rate for a period of 5 minutes. The upper opening of the permanent mold is then covered using a thermal insulator and the alloy is allowed to completely solidify and to cool to room temperature.

Once cooled down, the 1.8 kg billet is removed from the mold and both ends are cut with a band saw. The billet is then extruded using a 500-ton hydraulic press, in an anhydrous chamber at room temperature, to form a thin foil having a thickness of about 300 μm (U.S. Pat. No. 7,194,884) and in order to obtain a homogeneous binary alloy that can serve as basis for producing ternary alloys.

A chemical analysis by ICP-OES was carried out on the binary Li—Mg10 alloy thin foil and a magnesium content of 10.8% by weight was obtained.

Example 2: Preparation of Ternary Alloy Electrode Materials (a) Ternary Li—Al0.2-Na0.2 Alloy The ternary alloy is prepared by combining via a melting process 44.8 g of the binary alloy prepared according to Example 1(a) with 0.095 g of metallic component $X^2$, in this case sodium (0.2% by weight).

The melting system for this alloy consists of a resistance furnace having a power of 20 kW in which is placed a closed cylindrical crucible made of stainless steel 304. The closed cylindrical crucible consists of three parts: a hollow container having an inner diameter of 2 inches, a flat lid and a second lid equipped with a cross-shaped rod serving as a stirrer. The lids are sealed at both ends of the container with copper gaskets. A 13 µm thick 302 stainless steel foil (Lyon Industries™) is placed on the flat lid to limit adhesion of the alloy to the lid during solidification.

The cylinder is placed inside a glove box under helium inert atmosphere to prevent any reaction that may contaminate the lithium alloy. The copper gaskets are firmly tightened to ensure the absence of liquid lithium leaks. The assembly is placed so as to allow the closed crucible to be rolled in the resistance furnace and thus allow the intermittent agitation of the liquid metal. The closed crucible remains in the furnace at 300° C. for 3 hours. The crucible is then removed from the furnace and deposited on the flat lid side (stainless steel foil side facing downwards) in order to solidify a cylindrical ternary lithium alloy ingot.

(b) Other Ternary Alloys

Several other ternary Li—$X^1$—$X^2$ alloys were prepared in a manner similar to Example 2(a). Table 1 summarizes the ternary alloys prepared and tested.

TABLE 1

Lithium alloys prepared and tested

| Alloys Li—$X^1$—$X^2$ | Element $X^1$ | [$X^1$] (%) | Element $X^2$ | [$X^2$] (%) |
|---|---|---|---|---|
| A | Al | 0.21 | — | — |
| B | Al | 0.21 | Ca | 0.23 |
| C | Al | 0.21 | Ce | 0.13 |
| D | Al | 0.21 | Na | 0.21 |
| E | Al | 0.21 | Sr | 0.22 |
| F | Al | 0.20 | Zn | 0.95 |
| G | Mg | 10.8 | — | — |
| H | Mg | 5.4 | Al | 0.10 |
| I | Mg | 10.2 | Al | 0.19 |
| J | Mg | 10.8 | Na | 0.26 |
| K | Mg | 10.8 | Sr | 0.20 |
| L | Mg | 10.7 | Zn | 1.2 |

Example 3: Preparation of Lithium-Based Alloy Thin Foils by Extrusion

For each alloy of Examples 1 and 2, the hollow container of the crucible carrying the ingot is reassembled in an extrusion device in an anhydrous room (dew point<−40° C.). The ingot is then extruded in dry air at room temperature using a 100-ton hydraulic press, in a thin ribbon form (about 600 µm thick and 40 mm wide).

Example 4: Preparation of Lithium-Based Alloy Thin and Ultra-Thin Foils by Lamination The extruded ribbons from Example 3 are then rolled at room temperature in an anhydrous chamber (dew point<−40° C.) using a jeweler's rolling mill to obtain a thin ribbon having a thickness of 200 µm in a single step. For example, rolling significantly improves the surface finish of the lithium ribbon (U.S. Pat. No. 5,528,920).

Example 5: Preparation of Cells

According to one example, the binary (Li—$X^1$) and ternary (Li—$X^1$—$X^2$) alloy foils of Example 4 are used in the manufacture of pouch-type symmetric cells. The symmetric cells of this example comprise the following elements: a plasticized aluminized pouch, two nickel terminal tabs for connection, two nickel current collectors, two lithium alloy electrodes, a mask having a defined size and the solid polymer electrolyte. A schematic of the symmetric pouch-type cell assembly is shown in FIG. 2 (Rosso, M. et al. Electrochim. Acta 51.25 (2006): 5334-5340).

(a) Electrodes

The electrodes (positive and negative) are composed of the same lithium alloy according to Table 1 supported on a nickel current collector.

(b) Electrolyte

The solid polymer electrolyte, which also serves as a separator, consists of an ethylene oxide copolymer in which a lithium salt $(CF_2SO_2)_2NLi$ (or LiTFSI) is dissolved in an O:Li ratio of 30:1 (O being the number of oxygen atoms in the copolymer). The patents (U.S. Pat. Nos. 4,578,326 and 4,758,483) describe non-limiting examples of copolymers that can be used. These copolymers may be cross-linked, if required, by any method known in the art. The electrolyte is also obtained by coating on a detachable support followed by a transfer on the electrode.

(c) Mask (or Cache)

A polypropylene mask of a 28 µm thickness has a circular opening of ⅞ inch in diameter (22.23 mm). The mask thus exposes an effective electrode surface of 3.879 cm².

(d) Cells

Cell 1

The first symmetrical cell example, named Cell 1 (reference: binary alloy), comprises the following elements:
Ni/Li—Al0.2 (200 µm)/Electrolyte (46 µm)/Li—Al0.2 (200 µm)/Ni Cell 2

The second symmetrical cell, named Cell 2 (ternary alloy), comprises the following elements:
Ni/Li—Al0.2-Na0.2 (200 µm)/Electrolyte (46 µm)/Li—Al0.2-Na0.2 (200 µm)/Ni Cell 3

The third symmetrical cell example, named Cell 3 (reference: binary alloy), comprises the following elements:
Ni/Li—Mg10 (200 µm)/Electrolyte (46 µm)/Li—Mg10 (200 µm)/Ni Cell 4

The fourth symmetrical cell, named Cell 4 (ternary alloy), comprises the following elements:
Ni/Li-Mg10-Na0.2 (200 µm)/Electrolyte (46 µm)/Li-Mg10-Na0.2 (200 µm)/Ni Example 6: Lithium Electrochemical Properties of the Symmetric Cells The electrochemical measurements were carried out on the electrochemical cells of Example 5 at a temperature of 80° C. using a VMP-3 potentiostat (Biologics) equipped with a frequency analyzer.

(a) Potentiostatic Electrochemical Impedance Spectroscopy (PEIS)

Potentiostatic electrochemical impedance spectroscopy (PEIS) performs impedance measurements in potentiostatic mode by applying a sinus ($\Delta E=5$ mV) around a potential (E=0) set relative to the open circuit potential of the cell ($E_{oc}$).

A simple way to "measure the quality" of contacts is to perform impedance measurements on the symmetric cells. A low amplitude alternating voltage $E+\Delta E$ is applied to the circuit over a frequency range (1 MHz to 1 mHz). The measurement of current i which passes in the cell makes it possible to determine the impedance Z of the cell and in particular to differentiate the contributions of the various cell elements. The resistance of the electrolyte ($R_e$) and of the interface ($R_i$) are measured from the Nyquist plot (graph of $-\mathrm{Im}(Z)$ vs. $R_e(Z)$) (FIG. 3).

Figure 3:
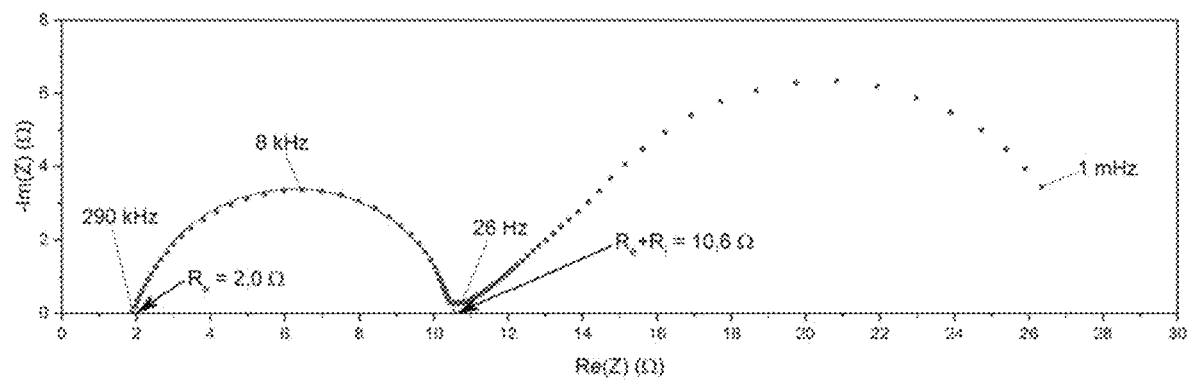
FIG. 3 displays an electrochemical impedance measurement recorded on Cell 1 of Example 5.

Electrochemical impedance measurements of the symmetrical cells were made by PEIS over the frequency range 1 MHz to 1 mHz, with a potential of E=0 vs. $E_{oc}$ and an amplitude $\Delta E$ of 5 mV (FIG. 3). A resistance of the interface ($R_i$) of 8.6 Ohm was obtained for the symmetrical cell in FIG. 3. The quality of the cell assemblies was evaluated by reproducibility of the interface resistance values.

(b) Galvanostatic Polarization

The current density during lithium electroplating has a significant impact on the formation and growth of dendrites. Generally, lower current densities translate into a relatively stable cycling and, inversely, a high current density accelerates the degradation process of rechargeable Li-metal batteries. Thus, when symmetrical cells are polarized using a constant current density (j), two types of behavior may be observed:

if j>J*, diverges after a certain time (Sand's time);
or if j<J*, the potential stabilizes towards a steady state.

The intersection between the two regimes is the limit current density (J*):

$$J^* = \frac{2nFDC}{(1-t_c)L}$$

where n is the charge number of lithium (n=1), F is the Faraday constant, C is the initial LiTFSI concentration in the electrolyte, D is the ambipolar diffusion coefficient of LiTFSI, $t_c$ is the cationic transference number of $Li^+$ and L is the inter-electrode distance (Brissot, C. et al. *J. of Power Sources* 81-82 (1999): 925-929).

Since an applied current density leads to an ion concentration gradient; a high current density translates into a near-zero ion concentration at the negative electrode level and by the formation of lithium dendrites at Sand's times ($\tau_s$):

$$\tau_S = \pi D \left[\frac{nFC}{2j(1-t_c)}\right]^2$$

where n is the charge number of lithium (n=1), F is the Faraday constant, C is the initial LiTFSI concentration in the electrolyte, D is the diffusion coefficient of LiTFSI, $t_c$ is cationic transference number of the $Li^+$ and j is the current density applied to the symmetrical cell (Reddy, T. B. Linden's Handbook of Batteries, 4th Edition, McGraw-Hill Education, 2010).

Figure 4:
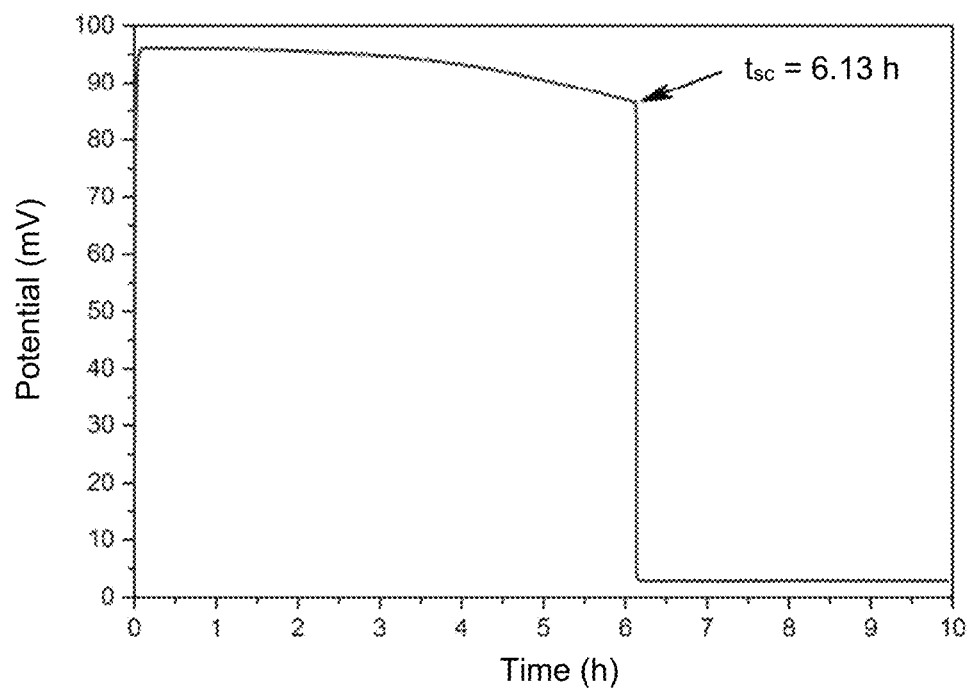
FIG. 4 shows the measurement of the short circuit time for Cell 2 of Example 5 at a current density of 0.8 mA/cm$^2$.
Figure 5:
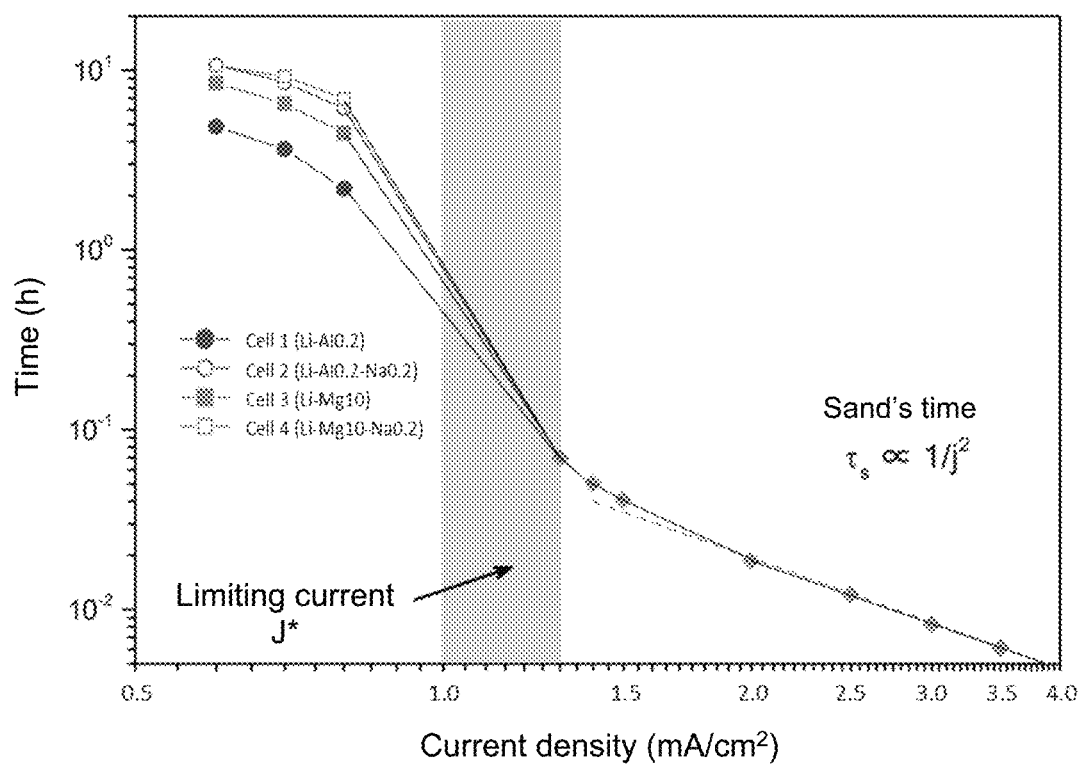
FIG. 5 shows the results of the short-circuit time at a current density of 0.6 mA/cm$^2$, 0.7 mA/cm$^2$ and 0.8 mA/cm$^2$ for Cell 1 (line with filled circle markers), Cell 2 (line with unfilled circle markers), Cell 3 (line with filled square markers) and Cell 4 (line with unfilled square markers) of Example 5.

A low current density leads to a minimal and stable ion concentration gradient and so no lithium dendrite should form under this condition. However, the experimental results clearly indicate that lithium dendrites still exist (FIG. 4). The time after which the potential starts to drop, namely the short-circuit time ($t_{sc}$), can be recorded (Rosso, M. et al. *J. of Power Sources* 97-98 (2001): 804-806) It is thus possible to use this short-circuit time in order to measure the performance of the new with regard to dendritic growth (FIG. 5).

FIG. 4 shows the results of a polarization using a constant current density of 0.8 mA/cm² leading to the short-circuit failure of the symmetrical cell (Cell 2) for 6.13 hours. FIG. 5 shows the results of short-circuiting time at current densities of 0.6 mA/cm², 0.7 mA/cm² and 0.8 mA/cm² for the cells of Example 5. It is possible to observe that the addition of 0.2% sodium to form ternary alloys leads to an increase in the short-circuit time compared to the corresponding binary alloys, which indicates a lower lithium dendrite formation rate on the surface of the anode and therefore a better stability.

Numerous modifications could be made to any of the embodiments described above without departing from the scope of the present invention as contemplated. Any references, patents or scientific literature documents referred to in the present application are incorporated herein by reference in their entirety for all purposes.

The invention claimed is:

1. Electrode material comprising, in the form of an alloy:
   metallic lithium;
   a metallic component $X^1$ selected from magnesium and aluminum; and
   a metallic component $X^2$ selected from alkali metals, alkaline earth metals, rare earths, zirconium, copper, silver, manganese, zinc, aluminum, silicon, tin, molybdenum and iron;
   wherein the metallic component $X^2$ is different from the metallic component $X^1$ and different from metallic lithium;
   wherein the metallic lithium is present at a concentration of at least 65% by weight, the metallic component $X^1$ is present at a concentration between 0.1 and 30% by weight, the component $X^2$ is present at a concentration between 0.1 and 5% by weight, and where the concentration of components $[X^1+X^2]$ in the material is between 0.2% and 35%, and where $[Li]>[X^1]>[X^2]$.

2. Electrode material comprising, in the form of an alloy:
   metallic lithium;
   a metallic component $X^1$ selected from magnesium and aluminum; and
   a metallic component $X^2$ selected from alkali metals, alkaline earth metals, rare earths, zirconium, copper, silver, bismuth, cobalt, zinc, aluminum, silicon, tin, antimony, cadmium, mercury, lead, manganese, boron, indium, thallium, nickel and germanium;
   wherein the metallic component X2 is different from the metallic component X1 and different from metallic lithium; and
   wherein the metallic lithium is present at a concentration of at least 65% by weight, the metallic component X1 is present at a concentration between 0.1 and 30% by weight, the component X2 is present at a concentration between 0.05 and 5% by weight, and where the concentration of the components [X1+X2] in the material is between 0.15% and 35%.

3. The electrode material according to claim 1, wherein the metallic component X1 is magnesium.

4. The electrode material according to claim 1, wherein the metallic component X1 is aluminum.

5. The electrode material according to claim 1, wherein the metallic component X2 is selected from Na, K, Zr and rare earths.

6. The electrode material according to claim 1, wherein the metallic component $X^2$ is an alkali metal selected from Na, K, Rb and Cs.

7. The electrode material according to claim 1, wherein the metallic component $X^2$ is an alkaline earth metal selected from Mg, Ca, Sr and Ba.

8. The electrode material according to claim 1, wherein the metallic component $X^2$ is a rare earth selected from Sc, Y, La, Ce, Pr, Nd, Sm, Eu, Gd, Tb, Dy, Er, Tm, Yb, Lu and their mixtures (such as a mischmetal).

9. The electrode material according to claim 2, wherein the metallic component $X^2$ is a rare earth selected from Sc, Y, La, Ce, Pr, Nd, Sm, Eu, Gd, Tb, Dy, Ho, Er, Tm, Yb, Lu and their mixtures (such as a mischmetal).

10. The electrode material according to claim 1, wherein the metallic component $X^2$ is selected from Zr, Cu, Ag, Mn, Zn, Al, Si, Sn, Mo or Fe.

11. The electrode material according to claim 2, wherein the metallic component $X^2$ is selected from Zr, Cu, Ag, Bi, Co, Zn, Al, Si, Sn, Sb, Cd, Hg, Pb, Mn, B, In, TI, Ni or Ge.

12. The electrode material according to claim 1, wherein the electrode material is a thin foil having a thickness of 15 to 300 µm.

13. The electrode material according to claim 12, wherein the thickness is of 15 to 200 µm.

14. The electrode material according to claim 12, wherein the thickness is of 15 to 100 µm.

15. The electrode material according to claim 12, wherein the thickness is of 15 to 50 µm.

16. Process for preparing an electrode material as defined in claim 1, the process comprising the following steps:
   a. alloying by melting the metallic lithium with the metallic component $X^1$ in a molten alloy bath;
   b. adding the metallic component $X^2$ to the molten alloy bath; and
   c. solidifying the alloy obtained in (b) in a permanent mold in a form suitable for extrusion such as in the form of a billet.

17. The process according to claim 16, which further comprises the following steps:
   d. transforming the solid billet into a thin foil (100-600 µm) suitable for rolling; and
   e. transforming the thin foil into a thin foil (15-200 µm) by rolling.

18. The process according to claim 16, which further comprises the following steps:
   d. transforming the solid billet into a thin foil (100-300 µm) suitable for rolling; and
   e. transforming the thin foil into an ultra-thin foil (15-50 µm) by lamination in a single step.

19. The method according to claim 16, wherein the alloy solidification step is carried out in a permanent mold at a controlled rate.

20. Anode comprising an electrode material according to claim 1 applied on a current collector.

21. Anode comprising the ultra-thin foil obtained in step (e) of the process as defined in claim 17 applied on a current collector.

22. Electrochemical cell comprising a cathode, an electrolyte and an anode, wherein the anode comprises an electrode material as defined in claim 1.

23. Electrochemical cell comprising a cathode, an electrolyte and an anode as defined in claim 20.

24. Electrochemical cell comprising a cathode, an electrolyte and an anode comprising the electrode material obtained by the process as defined in claim 16.

25. A lithium accumulator comprising an electrochemical cell as defined in claim 22.

* * * * *